United States Patent
Piipponen et al.

(10) Patent No.: US 7,787,844 B2
(45) Date of Patent: Aug. 31, 2010

(54) CONTROLLING METHOD, CONTROLLING APPARATUS, COMMUNICATION DEVICE, COMPUTER PROGRAM, COMPUTER PROGRAM DISTRIBUTION MEDIUM AND DATA PROCESSING METHOD

(75) Inventors: Antti Piipponen, Tampere (FI); Aarno Pärssinen, Espoo (FI)

(73) Assignee: Nokia Corporation, Espoo (FI)

( * ) Notice: Subject to any disclaimer, the term of this patent is extended or adjusted under 35 U.S.C. 154(b) by 926 days.

(21) Appl. No.: 11/517,478

(22) Filed: Sep. 8, 2006

(65) Prior Publication Data
US 2008/0004070 A1  Jan. 3, 2008

(30) Foreign Application Priority Data
Jun. 29, 2006  (FI)  .................................. 20065454

(51) Int. Cl.
H04B 1/18 (2006.01)
(52) U.S. Cl. ................. 455/181.1; 455/502; 455/171.1; 455/13.2; 370/324; 375/355
(58) Field of Classification Search ............... 455/181.1, 455/502, 171.1, 13.2, 208, 265, 231; 370/324, 370/350, 503; 375/355, 359
See application file for complete search history.

(56) References Cited

U.S. PATENT DOCUMENTS

| | | | | |
|---|---|---|---|---|
| 4,885,715 | A | * | 12/1989 | McCanny et al. ........... 708/420 |
| 5,459,816 | A | * | 10/1995 | Basehore et al. ............... 700/50 |
| 5,649,303 | A | | 7/1997 | Hess et al. |
| 6,006,106 | A | * | 12/1999 | Cook et al. ............... 455/552.1 |
| 6,138,010 | A | | 10/2000 | Rabe et al. |
| 6,281,818 | B1 | | 8/2001 | Miller |
| 6,741,639 | B1 | | 5/2004 | Yoshida et al. |
| 6,816,476 | B2 | * | 11/2004 | Kim et al. .................... 370/342 |
| 6,836,506 | B2 | * | 12/2004 | Anderson .................... 375/145 |
| 6,978,121 | B1 | | 12/2005 | Lane et al. |
| 7,373,156 | B2 | * | 5/2008 | Ruutu et al. .............. 455/456.2 |
| 7,447,179 | B2 | * | 11/2008 | Lu .............................. 370/335 |
| 2002/0012381 | A1 | | 1/2002 | Mattisson et al. |
| 2002/0098864 | A1 | | 7/2002 | Mukai et al. |

(Continued)

FOREIGN PATENT DOCUMENTS

EP  0941002 A2  9/1996

(Continued)

OTHER PUBLICATIONS

International Search Report PCT/FI2007/050386 filed Jun. 26, 2007.

(Continued)

*Primary Examiner*—Minh D Dao
(74) *Attorney, Agent, or Firm*—Squire, Sanders & Dempsey, LLP (57) ABSTRACT

The invention relates to a controlling apparatus configured to: search for at least one predetermined conversion function, check a system time of at least one radio protocol, define a common multiradio reference time, convert the system time of at least one radio protocol to the common multiradio reference time with the at least one conversion function and process control commands in the common multiradio reference time, and/or convert the common multiradio reference time to the system time of at least one radio protocol with the at least one conversion function and process control commands in the system time.

17 Claims, 3 Drawing Sheets

U.S. PATENT DOCUMENTS

| | | | |
|---|---|---|---|
| 2002/0176524 A1 | 11/2002 | Popper et al. | |
| 2003/0078037 A1 | 4/2003 | Auckland et al. | |
| 2003/0125019 A1 | 7/2003 | Bajikar | |
| 2003/0169827 A1 | 9/2003 | Shi et al. | |
| 2004/0018818 A1 | 1/2004 | Hottinen et al. | |
| 2004/0023678 A1* | 2/2004 | Fredriksson | 455/502 |
| 2004/0042576 A1* | 3/2004 | Anderson | 375/365 |
| 2004/0185899 A1 | 9/2004 | Hayem et al. | |
| 2004/0225461 A1 | 11/2004 | Floyd et al. | |
| 2004/0243331 A1 | 12/2004 | Davis et al. | |
| 2005/0020299 A1 | 1/2005 | Malone et al. | |
| 2005/0095982 A1* | 5/2005 | Blanchard et al. | 455/12.1 |
| 2005/0131636 A1* | 6/2005 | Derambure et al. | 701/207 |
| 2005/0201355 A1 | 9/2005 | Saito | |
| 2005/0239497 A1 | 10/2005 | Bahl et al. | |
| 2006/0084469 A1 | 4/2006 | Malone et al. | |
| 2006/0221926 A1 | 10/2006 | Maekawa et al. | |
| 2006/0238418 A1* | 10/2006 | Monnerat et al. | 342/357.09 |
| 2007/0165594 A1* | 7/2007 | Heinle et al. | 370/350 |
| 2008/0112517 A1* | 5/2008 | Parts et al. | 375/346 |
| 2008/0267160 A1* | 10/2008 | Ibrahim et al. | 370/345 |
| 2008/0293445 A1* | 11/2008 | Piippponen et al. | 455/550.1 |

FOREIGN PATENT DOCUMENTS

| | | |
|---|---|---|
| EP | 1389855 A2 | 2/2004 |
| GB | 2 402 843 | 12/2004 |
| GB | 2407178 A | 4/2005 |
| WO | WO 2006/096864 A2 | 9/2006 |
| WO | WO 2007/060494 A1 | 5/2007 |

OTHER PUBLICATIONS

Lansford et al., "Wi-Fi (802.11b) and Bluetooth: Enabling Coexistence," Sep./Oct. 2001, pp. 20-27.

* cited by examiner

CONTROLLING METHOD, CONTROLLING APPARATUS, COMMUNICATION DEVICE, COMPUTER PROGRAM, COMPUTER PROGRAM DISTRIBUTION MEDIUM AND DATA PROCESSING METHOD

FIELD

The invention relates to a controlling method, controlling apparatus, communication device, computer program, computer program distribution medium and a data processing method.

BACKGROUND

New radio technologies are emerging, and user devices in a communications system are designed to be capable to use multiple radio systems, such as Global System for Mobile communication (GSM), Universal Mobile Telephone System (UMTS) and Personal Communications Services (PCS).

Additionally, new kind of services and other networks than cellular radio systems have also been developed. Examples of such services are Wireless Local Area Network (WLAN) offering a wireless access to the Internet, Global Positioning System (GPS) and Digital Video Broadcasting—Handheld (DVB-H) offering reception of digital television transmissions.

If a communication device supports more than one communications system, such as UMTS, or service protocol, such as DVB-H, the device can be called a multiradio device.

In radio frequency (RF) circuit designs for such multiradio devices, receiver and transmitter chains are usually re-configurable for use in different communications systems. In other words, there are not necessarily separate transceivers for each supported system.

The use of shared resources, such as radio frequency hardware, is a motivation to time domain scheduling of active radio systems. Simultaneous operations also cause inter-system interference, which leads to interoperability problems.

There are several prior art methods to improve the interoperability. One of them is simply using prioritization: a higher priority system can block out a lower priority system. This approach is not practical, since the lower priority system has problems in traffic scheduling.

Another approach is using inter-system handoffs. However, this is not suitable for managing low-level, such as radio frequency hard ware, resources, if inter-system operation has not been solved in the standardization bodies. Namely, during a typical prior-art handoff procedure, one of communication systems requires a resource access independent from the other.

BRIEF DESCRIPTION OF THE INVENTION

According to an aspect of the invention, there is provided a controlling apparatus, comprising: means for searching for at least one predetermined conversion function; means for checking a system time of at least one radio protocol; means for defining a common multiradio reference time; means for converting the system time of at least one radio protocol to the multiradio time with the at least one conversion function; and means for processing control commands in the common multiradio reference time, and/or means for converting the common multiradio reference time to the system time of at least one radio protocol with the at least one conversion function and means for processing control commands in the system time.

According to an aspect of the invention, there is provided a controlling apparatus, configured to: search for at least one predetermined conversion function; check a system time of at least one radio protocol; define a common multiradio reference time; convert the system time of at least one radio protocol to the common multiradio reference time with the at least one conversion function and process control commands in the common multiradio reference time, and/or convert the common multiradio reference time to the system time of at least one radio protocol with the at least one conversion function and process control commands in the system time.

According to an aspect of the invention, there is provided a control method in a communication system, the method comprising: searching for at least one predetermined conversion function; checking a system time of at least one radio protocol; defining a common multiradio reference time; converting the system time of at least one radio protocol to the common multiradio reference time with the at least one conversion function and processing control commands in the common multiradio reference time, and/or converting the common multiradio reference time to the system time of at least one radio protocol with the at least one conversion function and processing control commands in the system time.

According to an aspect of the invention, there is provided a communication device, configured to: search for at least one predetermined conversion function or receive the at least one predetermined conversion function; check a system time of at least one radio protocol; define a common multiradio reference time; convert the system time of at least one radio protocol to the common multiradio reference time with the at least one conversion function and process control commands in the common multiradio reference time, and/or convert the common multiradio reference time to the system time of at least one radio protocol with the at least one conversion function and process control commands in the system time.

According to an aspect of the invention, there is provided a computer program product encoding a computer program of instructions for executing a computer process for controlling, the process comprising: searching for at least one predetermined conversion function; checking a system time of at least one radio protocol; defining a common multiradio reference time; converting the system time of at least one radio protocol to the common multiradio reference time with the at least one conversion function and processing control commands in the common multiradio reference time, and/or converting the common multiradio reference time to the system time of at least one radio protocol with the at least one conversion function and processing control commands in the system time.

According to an aspect of the invention, there is provided a computer program distribution medium readable by a computer and encoding a computer program of instructions for executing a computer process for controlling, the process comprising: searching for at least one predetermined conversion function; checking a system time of at least one radio protocol; defining a common multiradio reference time; converting the system time of at least one radio protocol to the common multiradio reference time with the at least one conversion function and processing control commands in the common multiradio reference time, and/or converting the common multiradio reference time to the system time of at least one radio protocol with the at least one conversion function and processing control commands in the system time.

According to an aspect of the invention, there is provided a data processing method in a communication system, the method comprising: defining at least one conversion function, and storing the at least one conversion function.

The invention provides several advantages.

An embodiment of the invention provides a possibility to derive system times for different communication protocols (communications system and/or service protocols), which improves interoperability by, for instance, shortening guard times and overhead.

LIST OF DRAWINGS

In the following, the invention will be described in greater detail with reference to the embodiments and the accompanying drawings, in which.

DESCRIPTION OF EMBODIMENTS

There are many different radio protocols to be used in communications systems. Some examples of different communication systems are the Universal Mobile Telecommunications System (UMTS) radio access network (UTRAN), Global System for Mobile Communications (GSM) and its modifications, Wireless Local Area Network (WLAN), Worldwide Interoperability for Microwave Access (WiMAX), Bluetooth®, Personal Communications Services (PCS) and systems using ultra-wideband (UWB) technology.

Figure 1:
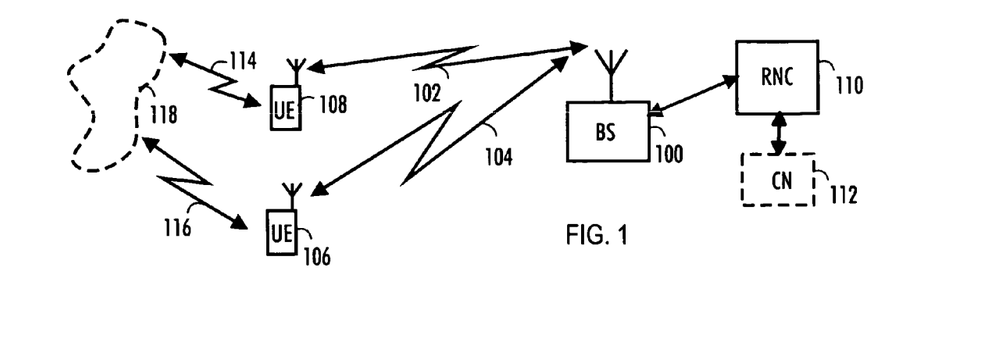
FIG. 1 shows an example of a communications system.

FIG. 1 is a simplified illustration of a communications system to which embodiments according to the invention are applicable. FIG. 1 shows a part of a UMTS radio access network (UTRAN). UTRAN is a radio access network which includes wideband code division multiple access (WCDMA) technology.

The communications system is a cellular radio system which comprises a base station (or node B) 100, which has bi-directional radio links 102 and 104 to user devices 106 and 108. The user devices may be fixed, vehicle-mounted or portable. The user devices are multiradio devices being equipped to operate in a plurality of communication systems and/or providing support for several services. Hence, in this example, the user devices are able to support in addition to UMTS also WLAN or Bluetooth®, for instance. The other systems are marked in FIG. 1 with a cloud 118. The user devices may include a wireless headset, GPS apparatus, etc. for providing connections to other systems and/or additional services. Connections to other communications systems are marked in FIG. 1 with arrows 114, 116.

The base station includes transceivers, for instance. From the transceivers of the base station, a connection is provided to an antenna unit that establishes bi-directional radio links to the user devices. The base station is further connected to a controller 110, a radio network controller (RNC), which transmits the connections of the devices to the other parts of the network. The radio network controller controls in a centralized manner several base stations connected to it. The radio network controller is further connected to a core network 112 (CN). Depending on the system, the counterpart on the CN side can be a mobile services switching centre (MSC), a media gateway (MGW) or a serving GPRS (general packet radio service) support node (SGSN), etc.

It should be noticed that in future radio networks, the functionality of an RNC may be distributed among (possibly a subset of) base stations.

The embodiments are not, however, restricted to the system given as an example but a person skilled in the art may apply the solution to other communications systems provided with the necessary properties. Different radio protocols may be used in the communication systems in which embodiments of the invention are applicable. The radio protocols used are not relevant regarding the embodiments of the invention.

The communications system is also able to communicate with other networks, such as a public switched telephone network or the Internet.

In radio frequency (RF) circuit designs for multiradio devices, receiver and transmitter chains are usually re-configurable for use in different communications systems. This creates a need for controlling shared resources.

Figure 2:
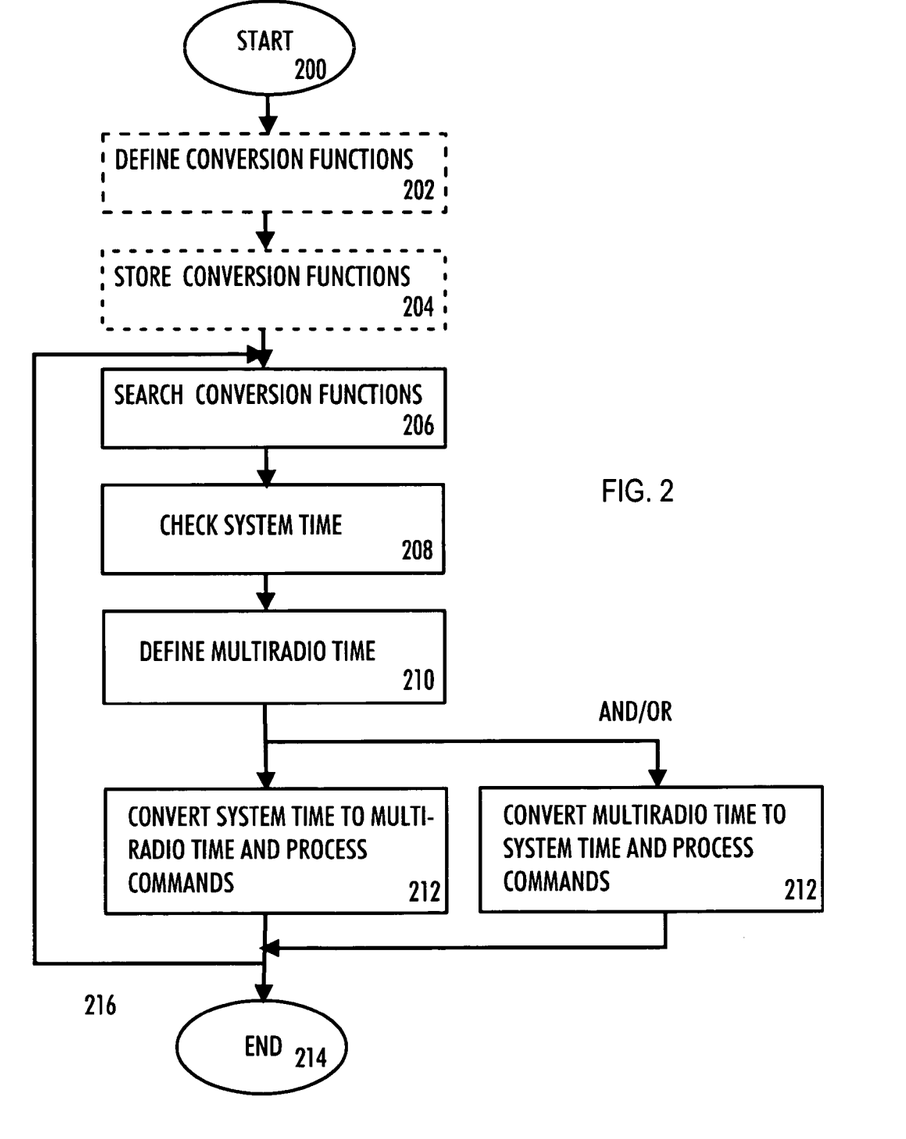
FIG. 2 is a flow chart.

Next, an embodiment of a controlling method according to the invention is explained in further detail by the means of FIG. 2. The embodiment carries out configuration control of a multiradio device. A common control point is required in a multiradio device for interference minimization and resource sharing. An embodiment of the invention uses a general clock for device control.

A typical multiradio device has a plurality of clock domains, at least one for each communications protocol or combination of communications protocol. Additionally, clock domains are also provided for control buses and microprocessors, as well as for a sleep clock, etc. Each radio protocol has its own timer which is activated, when the radio protocol is put into use. The timer is typically started from the time 0 (zero) and it runs using an invariable clock frequency.

It should be noticed, that timing is based on the well-known relation between time and frequency (time=1/frequency).

In an embodiment, system times of different operating radio protocols are transformed to and from a multiradio time provided by a predetermined clock by using conversion functions. In this application, multiradio time means a common time used in a multiradio device for radio protocols. By defining and using a multiradio time, time conception of different radio protocols can be harmonized. In this application, system time means time of a particular radio protocol. In this application, multiradio time is also called a common multiradio reference time.

The multiradio time may be the radio system time of a selected radio protocol. There are many possible grounds for the decision of which radio system is selected to give the multiradio time. One ground may be that the system which is switched on first gives the multiradio time. Another option is a protocol with the highest priority. The multiradio time may also be switched from one system time to another. Briefly, the multiradio time may be any time concept suitable for the use. A multiradio device may include a multiradio timer.

The timing hardware counts clock cycles with clock frequencies. Typically, a conversion function includes a static offset between a general timer (also called a multiradio timer) and a respective system timer, and a ratio of the general clock and system clock frequencies. This procedure enables the mapping of timing occurrence as timelines or other an appropriate manner of representation.

The concept of a static offset is now explained in further detail.

In order that the controlling system can put radio activities in a time-line (order in the time domain) it keeps track of static offsets of radio protocols. The static offset of a radio protocol is a multiradio counter value at the starting moment of the system counter of that radio protocol. If the system counter value (or the value of the multiradio counter) is updated for some reason, the static offset also changes to the value of the multiradio counter when that system counter would be zero. The system counter may be understood to also comprise high-level time keeping measures, such as a frame number count, multiframe count, etc.

If a timer of a radio protocol is updated (for example, when a terminal synchronizes to a GSM base station), a static offset in relation to multiradio time is also changed. As a new static offset may be selected the moment when a timer would have been zero without a break. A similar way of action may be applied when a counter goes around, i.e. starts again from zero.

In the following, data processing, i.e. defining and storing conversion functions is depicted in FIG. 2 by using dotted lines, since it is typically carried out in advance for providing conversion functions for controlling. The defining and storing of the conversion functions are typically carried out in advance, and the conversion functions may be stored in a user device or a network element in a production phase. Network may also convey conversion functions to a user device when needed.

An embodiment starts in block 200. Blocks 202 and 204 belong to a data processing part.

In block 202, at least one conversion function is defined. The conversion functions may be defined in advance, in which case they may be stored in a memory of a network element or a user device, or they may be defined every time when a new system is activated, in which case they are conveyed to a user device, or both.

Next, an example of a conversion function is given which is used when a GSM transceiver and a DVB-H receiver are operating simultaneously. The exemplary conversion function is depicted herein to further clarify the embodiment, but it is obvious to a person skilled in the art that for other protocol combinations there are provided other conversion functions.

Figure 3:
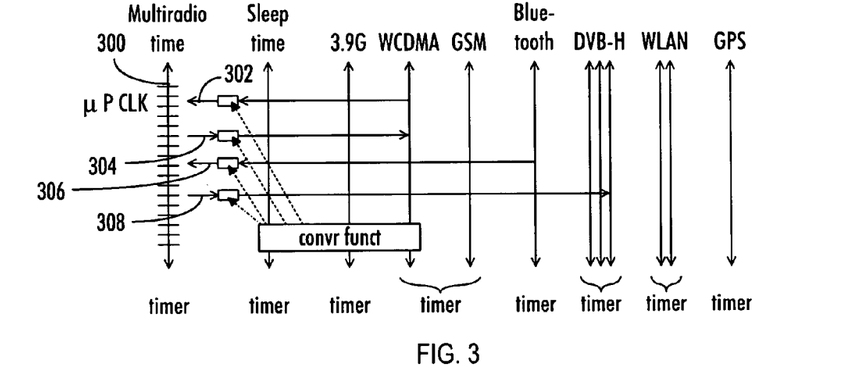
FIG. 3 depicts an example of the use of conversion functions.

In FIG. 3, it is depicted an example of the use of conversion functions. In this case, the DVB-H receive power is low and the signal reception is blocked during GSM transmissions due to the high power of the GSM transmissions.

In FIG. 3, a vertical axis 300 shows multiradio time. A chain 302 depicts time conversion from WCDMA time to multiradio time and a chain 304 depicts time conversion from multiradio time to WCDMA time. Correspondingly, a chain 306 depicts time conversion from Bluetooth® time to multiradio time and a chain 308 depicts time conversion from multiradio time to DVB-H time.

Figure 4:
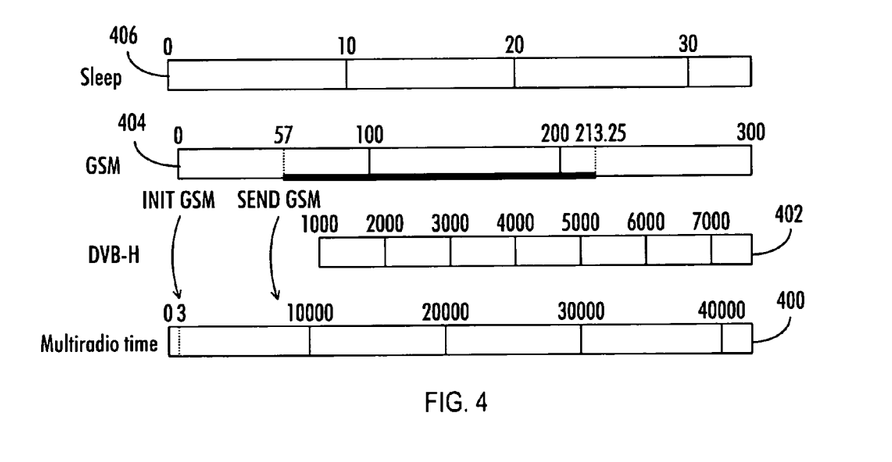
FIG. 4 depicts an example of a timing diagram.

FIG. 4 depicts a timing diagram of the example: a reference number 400 depicts multiradio time, 402 depicts a DVB-H counter, 404 depicts a GSM counter and 406 depicts a sleep clock of the device in question.

There is an offset between radio protocol time and multiradio time and a ratio of clock frequencies. In this case, for example, the multiradio time ($t_{MR}$) starts at time interval 0 (zero) and it is running at 38.4 MHz clock. Therefore $\Delta t_{MR}=1/38.4$ MHz=26.04 ns. The GSM clock runs at 270.833 kHz which gives $\Delta t_{GSM}=3.692$ μs. The DVB-H clock runs at 9.142857 MHz which gives $\Delta t_{DVB-H}=109.4$ ns, respectively.

In the example, the GSM timer is initialized at $t_{MR}=3$ cycles (see FIG. 4).

In the following, one conversion function is defined as an example. As known by a person skilled in the art, embodiments of the invention are not restricted to the exemplary conversion function.

Let
t be absolute time,
$\Delta t_{GSM}$ time resolution of a GSM counter (3.692 μs, i.e. $1/f_{GSM}$),
$c_{GSM}(t)$ a value of the GSM counter at time t,
$\Delta t_{MR}$ time resolution of a multiradio counter, and
$c_{MR}(t)$ a value of the multiradio counter at time t.

It should be noted that if we want to have a value of $c_{GSM}(t)$ or $c_{MR}(t)$ at points of time which do not result in integer number of cycles, we must use rounding towards zero.

The activation of a multiradio counter is at t=0:

$$c_{MR}(t)=t/\Delta t_{MR}, \text{ when } t \geq 0, \text{ otherwise}=0. \quad (1)$$

The activation of a GSM counter is at $t=t_{0,GSM}$:

$$c_{GSM}(t)=(t-t_{0,GSM})/\Delta t_{GSM}, \text{ when } t \geq t_{0,GSM}, \text{ otherwise}=0. \quad (2)$$

Let us define a static offset (defined above) of a GSM time in relation to a multiradio time to be $$c_{MR}(t_{0,GSM})=t_{0,GSM}/\Delta t_{MR} \quad (3)$$

in multiradio counter cycles.

Now, we can define the conversion function from the GSM time to the multiradio time in terms of respective counter values. From (1) and (2), solving t yields $t=c_{MR}(t)\cdot\Delta t_{MR}$, and $t=c_{GSM}(t)\cdot\Delta t_{GSM}+t_{0,GSM}$, respectively.
Now we can write $c_{MR}(t)\cdot\Delta t_{MR}=c_{GSM}(t)\cdot\Delta t_{GSM}+t_{0,GSM}$, solve $t_{0,GSM}$ from (3) and substitute it, leading finally to $$c_{MR}(t)=c_{GSM}(t)\cdot\Delta t_{GSM}/\Delta t_{MR}+c_{MR}(t_{0,GSM}). \quad (4)$$

As we can see, the conversion function from a GSM time to a multiradio time includes the current value of a GSM counter, scaled by a ratio of clock frequencies, then increased by a static offset. A similar conversion function is possible between arbitrary counters as long as clock frequencies and static offsets are known.

Since the multiradio time resolution is 1/frequency, and system clocks generally have different clock frequencies, the conversion functions typically yield a non-integer number of clock cycles as also in the example above.

In practical implementations, non-integer clock cycles are usually rounded to an integer number of clock cycles, for example the rounding function is "floor" (up-rounding) or "ceiling" (down-rounding) depending on the nature of the action. Actions that start operation are "floor" rounded and actions that stop operation are "ceiling" rounded, when system time is converted to multiradio time. This choice gives minimum guard times in the order of one clock cycle in the multiradio controlling system. Guard times may be needed in a situation, where edges of different clock signals match to each other poorly. It is possible that in some cases guard times are required to prevent control overhead. Another option is to use the rounding described above for executing selected operations in time.

Conversion functions corresponding to the one of the example can be used to transform multiradio time to radio protocol time or from radio protocol time to multiradio time.

In block 204, the at least one conversion function is stored for later use typically in a memory of a network device or a user device. The storing may be carried out once when the user device is turned on or several times depending on updating needs. The conversion functions are typically stored in a memory to be used when time transformations are needed.

Typically, a conversion function per radio protocol is defined for both directions: from the multiradio time (general time) and to the multiradio time. The conversion function can be defined for all radio protocols supported by the device in question.

In this embodiment, controlling includes blocks 206 to 212.

In block 206, at least one predetermined conversion function is searched for. The conversion functions are typically searched for from a memory of a network element or a user device. If conversion functions are not stored in a user device's memory, a network element may convey them to a user device.

It should be noticed that conversion functions may be similar to all radio systems; only parameters change. Thus, a conversion function may be stored in a user device's memory and only parameters are searched. In this application, searching parameters for conversion functions is also thought to belong to the conversion function search.

In block 208, a system time of at least one radio protocol is checked. The system time can be checked from a counter. Each radio protocol has an own counter which is activated, when the radio protocol is put into use.

In block 210, a multiradio time is defined. The multiradio time may be the radio system time of a selected radio protocol obtained from a system timer. There are many possible grounds for the decision of which radio system is selected to give the multiradio time. One ground may be that the system which is first put on gives the multiradio time. Another option is a protocol with the highest priority. The protocol having the highest priority can be determined in many ways, for instance, in a cellular phone, a cellular radio protocol may have the highest priority.

It is usually presumed that when a radio protocol is initialized, its counter runs at its nominal frequency. In this application, this is called a full power mode. Typically, in this state, the device is transmitting and receiving quite actively. A controlling system has to be in a full power mode, if it controls radio protocols, the inactive periods of which are relatively short.

On the other hand, if the inactive periods are long, it may be beneficial to turn off a radio transceiver, in which case static offsets and/or frequency ratios can be updated when the transceiver including the system counter is turned on again. If all the radio transceivers of the device are inactive for a long period, the multiradio control system may also be set to a sleep mode. A sleep mode typically refers to a mode where a clock is slowed down for saving current, if there is no need for data processing exists. When any radio system is set to sleep or idle mode, it may use a lower frequency clock as a counter. A wake up is based on that sequence. Therefore, a radio system may have one conversion function between a common multiradio reference time and a system time, and another conversion function between a common multiradio reference time and a sleep clock/counter of a radio system. The conversion function to be used is selected based on a mode of a system (protocol).

A new value for a multiradio timer can be calculated from a sleep timer conversion function, when the multiradio timer is in an operating mode again.

It should be noticed that, if the timers of different protocols are physically separated, an update signal may be required for synchronization purposes.

The multiradio counter may periodically compare its time to the times of radio protocols and update offsets between the multiradio time and times of different protocols.

In block 212, the system time of at least one radio protocol is converted to the multiradio time with the at least one conversion function and radio protocol and/or other related control commands are processed in the multiradio time, and/or the multiradio time is converted to the system time of at least one radio protocol with the at least one conversion function and radio protocol and/or other related control commands are processed in the system time.

Briefly, the target of the transfer is that multiradio time and each selected radio protocol time are expressed in relation to each other, or in other words, times are expressed in the time of a selected clock instead of several different clocks.

To enable the controlling of a multiradio function of the device, transceiver activities may be put on a timeline or represented in another manner, in which they are expressed in relation to each other and/or to multiradio time. For the timeline expression, conversion functions are needed.

A multiradio timer is activated when a device including the multiradio control system is switched on. Radio protocols supported by the device have timers of their own, which are activated when a transceiver of the radio protocol is switched on. The static offset of a radio protocol is the starting moment of that radio protocol, that is the moment when its timer was started. For instance, when a Bluetooth® protocol is activated, a static offset of the Bluetooth® transceiver is the time when the Bluetooth® timer is switched on.

When a clock frequency of a multiradio timer, a clock frequency of the radio protocol the time of which is to be transferred and a static offset of the radio protocol are known, times are transferable from radio protocol time to multiradio time and vice versa.

When times are expressed in relation to each other, control system is able to track the use of resources, such as receiver branches.

Radio protocol control commands are typically related to establishing, terminating and controlling a radio connection.

In an embodiment, the processing of the radio protocol command comprises scheduling resources according to the radio protocol commands in the multiradio time, and activating the resources in the system time, the system time being an original system time or obtained from the time conversion from multiradio time to system time, or scheduling and activating the resources according to the radio protocol commands in the multiradio time.

When scheduling is carried out in multiradio time, it is possible to minimize interference between different radio protocols and utilize resources efficiently. This typically demands that radio protocols are scheduled relative to each other, that is to say, by taking into account resource needs as a whole.

On the other hand, sometimes it might be more beneficial to activate resources in a system time instead of multiradio time. For instance, radio protocols have timing limits for several actions, such as for a beginning of a transmission. Conversions between different clock domain usually cause insecurity in the accuracy of a clock signal. In order to limit inaccuracy, original system time or time obtained from a time conversion from multiradio time to system time may be used.

The embodiment ends in block 214. The embodiment is repeatable in several different ways. An arrow 216 shows one option: the embodiment is repeated for another radio protocol. As can be seen, conversion functions do not need to be defined for every new radio protocol each time when the radio transceiver of the protocol is activated. Conversion functions may be stored in a memory in advance for all radio protocols supported by the device in question. Another option is that a network provides the conversion functions when required, for instance when requested by a message.

Attention should be paid to the fact that a clock may be changed for some other reasons than only to obtain a common multiradio reference time.

The embodiments of the invention may be implemented as a computer program comprising instructions for executing a computer process for configuration controlling.

The computer program may be stored on a computer-readable storage medium. The computer program can include program code for controlling a processor to execute a process. The computer-readable storage medium may include at least one of the following media: a computer readable medium, a program storage medium, a record medium, a computer readable memory such as a random access memory, and an erasable programmable read-only memory.

Other than a computer program implementation solutions are also possible, such as different hardware implementations (modules), e.g. a circuit built of separate logics components or one or more client-specific integrated circuits (Application-Specific Integrated Circuit, ASIC). A hybrid of these implementations is also feasible.

Next, a structure of a communication device providing support for a plurality of different radio protocols will be described with reference to the simplified example of FIG. 5. The embodiments are not, however, restricted to the device given as an example but a person skilled in the art may apply the solution to other devices provided with the necessary properties.

The communication device may be a mobile phone, a computer, a laptop, or PDA (Personal Digital Assistant). It should be noticed that the communication device may also provide characteristics of several devices, such as a computer capable of offering wireless data or speech transfer services.

The communication device of the example includes a plurality of communication interfaces 512 to 516 to provide wireless radio connections 508, 510 to other devices, such as base stations. The communication interfaces typically include at least one transceiver. The communication interfaces 512 to 516 usually provide connections employing different radio access technologies. It is obvious to a person skilled in the art that the number of communication interfaces may vary from one implementation to another.

The communication device further includes a control unit 502 to control functions of the device 500. The control unit 502 comprises means for creating radio connections between the communication device 500 and other communication devices or networks. The control unit 502 also comprises means for controlling a number of simultaneous radio connections in the communication device. The control unit may be configured to perform at least partly embodiments of the controlling method described above. Briefly, the control unit of the example transfers times from general clock time to radio protocol clock time and/or from radio protocol time to general clock time by using the conversion functions.

The control unit 502 may be implemented with a digital signal processor with suitable software or with separate logic circuits, for example with ASIC (Application Specific Integrated Circuit). The control unit 502 may also be a combination of these two implementations, such as a processor with suitable software embedded within an ASIC.

The communication device typically comprises a memory unit 504 for storing conversion functions, for instance.

The communication device 500 further comprises a user interface 506 connected to the controlling unit. The user interface 506 may comprise a keyboard, a microphone, a loudspeaker, a display, and/or a camera.

Figure 5:
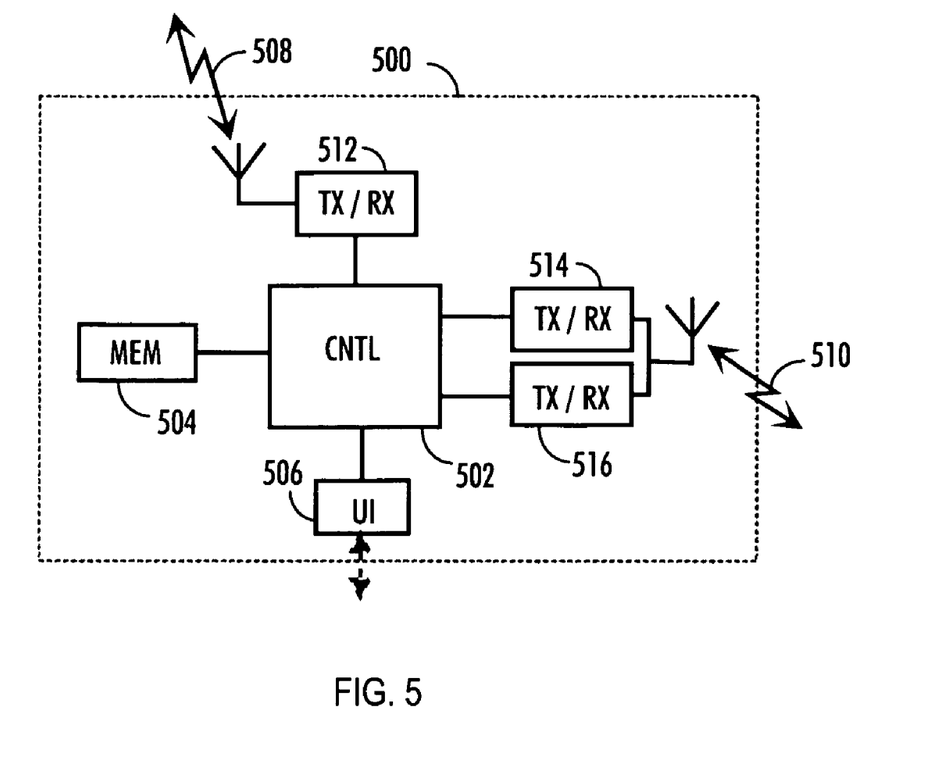
FIG. 5 illustrates an example of a communication device.

It is obvious to a person skilled in the art that the communication device may include parts, such as a battery, not depicted in FIG. 5.

Even though the invention has been described above with reference to an example according to the accompanying drawings, it is clear that the invention is not restricted thereto but it can be modified in several ways within the scope of the appended claims.

The invention claimed is:

1. An apparatus, comprising:
    means for searching for at least one predetermined conversion function, the at least one predetermined conversion function comprising a value of a counter scaled by a ratio of clock frequencies increased by a static offset for ordering timing occurrences in a time domain;
    means for checking a system time of at least one radio protocol;
    means for defining a common multiradio reference time; and
    the controlling apparatus comprising at least one of
        means for converting the system time of the at least one radio protocol to the common multiradio time with the at least one predetermined conversion function, and means for processing control commands in the common multiradio reference time, and
        means for converting the common multiradio reference time to the system time of the at least one radio protocol with the at least one predetermined conversion function and means for processing the control commands in the system time.

2. An apparatus, comprising:
    a processor; and
    a memory including computer program code,
    the memory and the computer program code configured to, with the processor, cause the apparatus at least to
        search for at least one predetermined conversion function, the at least one predetermined conversion function comprising a value of a counter scaled by a ratio of clock frequencies increased by a static offset for ordering timing occurrences in a time domain,
        check a system time of at least one radio protocol,
        define a common multiradio reference time, and
        perform at least one of
            convert the system time of the at least one radio protocol to the common multiradio reference time with the at least one predetermined conversion function and process control commands in the common multiradio reference time, and convert the common multiradio reference time to the system time of the at least one radio protocol with the at least one predetermined conversion function and process the control commands in the system time.

3. The apparatus of claim 2, the memory and the computer program code further configured to, with the processor, cause the apparatus at least to:
    schedule resources according to the control commands in the common multiradio reference time and activate the resources in the system time, the system time being original system time or a time obtained from a time conversion from the common multiradio reference time to the system time, or schedule and activate the resources according to the control commands in the common multiradio reference time.

4. The apparatus of claim 2, the memory and the computer program code further configured to, with the processor, cause the apparatus at least to round non-integer clock cycles to an integer number of clock cycles.

5. The apparatus of claim 2, wherein the common multiradio reference time is switched from one system time to another.

6. A method, comprising:
searching, by a processor, for at least one predetermined conversion function, the at least one predetermined conversion function comprising a value of a counter scaled by a ratio of clock frequencies increased by a static offset for ordering timing occurrences in a time domain;
checking, by the processor, a system time of at least one radio protocol;
defining, by the processor, a common multiradio reference time; and
performing, by the processor, at least one of
converting, by the processor, the system time of the at least one radio protocol to the common multiradio reference time with the at least one predetermined conversion function and processing control commands in the common multiradio reference time, and
converting, by the processor, the common multiradio reference time to the system time of the at least one radio protocol with the at least one predetermined conversion function and processing the control commands in the system time.

7. The method of claim 6, wherein the processing of the control commands comprises:
scheduling resources according to the radio protocol commands in the common multiradio reference time and activating the resources in the system time, the system time being an original system time or a time obtained from the time conversion from the common multiradio reference time to the system time, or
scheduling and activating the resources according to the radio protocol commands in the common multiradio reference time.

8. The method of claim 6, the method further comprising:
rounding non-integer clock cycles to an integer number of clock cycles.

9. The method of claim 6, further comprising:
switching the common multiradio reference time from one system time to another.

10. A communication device, comprising:
a processor; and
a memory including computer program code,
the memory and the computer program code configured to, with the processor, cause the communication device at least to
search for at least one predetermined conversion function or receive the at least one predetermined conversion function, the at least one predetermined conversion function comprising a value of a counter scaled by a ratio of clock frequencies increased by a static offset for ordering timing occurrences in a time domain,
check a system time of at least one radio protocol,
define a common multiradio reference time, and
perform at least one of
convert the system time of the at least one radio protocol to the common multiradio reference time with the at least one predetermined conversion function and process control commands in the common multiradio reference time, and/or
convert the common multiradio reference time to the system time of the at least one radio protocol with the at least one predetermined conversion function and process the control commands in the system time.

11. The communication device of claim 10, the memory and the computer program code further configured to, with the processor, cause the communication device at least to:
schedule resources according to the control commands in the common multiradio reference time and activate the resources in the system time, the system time being original system time or a time obtained from a time conversion from the common multiradio reference time to the system time, or
schedule and activate the resources according to the control commands in the common multiradio reference time.

12. The communication device of claim 10, the memory and the computer program code further configured to, with the processor, cause the communication device at least to round non-integer clock cycles to an integer number of clock cycles.

13. The communication device of claim 10, wherein the common multiradio reference time is switched from one system time to another.

14. A computer program embodied on a computer-readable storage medium, the computer program comprising program code for controlling a process to execute a process, the process comprising:
searching for at least one predetermined conversion function, the at least one predetermined conversion function comprising a value of a counter scaled by a ratio of clock frequencies increased by a static offset for ordering timing occurrences in a time domain;
checking a system time of at least one radio protocol;
defining a common multiradio reference time;
converting the system time of the at least one radio protocol to the common multiradio reference time with the at least one predetermined conversion function and processing control commands in the common multiradio reference time; and/or
converting the common multiradio reference time to the system time of the at least one radio protocol with the at least one predetermined conversion function and processing the control commands in the system time.

15. The computer program of claim 14, wherein the computer-readable storage medium comprises at least one of the following media: a computer readable medium, a program storage medium, a record medium, and a computer readable memory.

16. The computer program of claim 14, wherein the process further comprises rounding non-integer clock cycles to an integer number of clock cycles.

17. The computer program of claim 14, wherein the process further comprises switching the common multiradio reference time from one system time to another.

* * * * *